May 27, 1969  KATSUJI HIRAHARA  3,446,259
REMOVING SCABS FROM FRUIT
Filed Aug. 29, 1966  Sheet 1 of 6
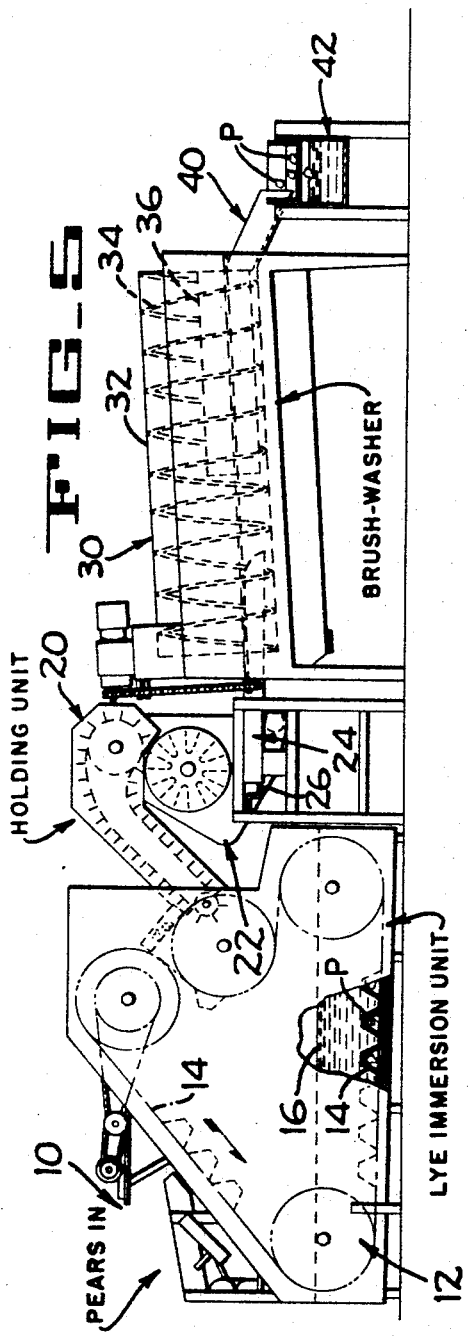
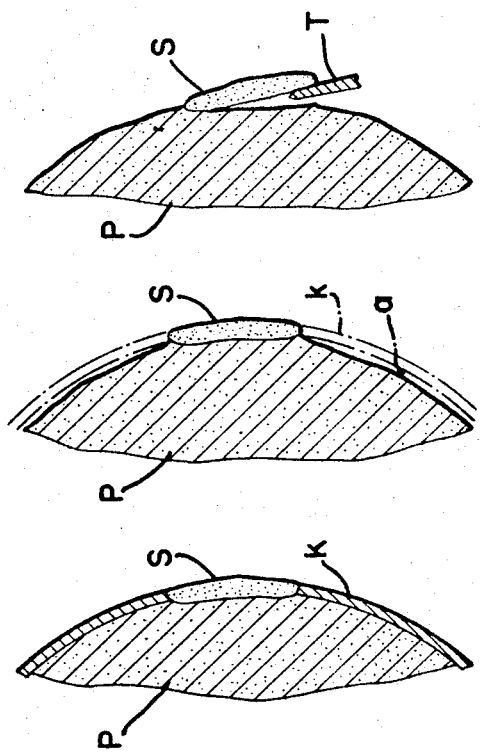
INVENTOR.
KATSUJI HIRAHARA
BY
Francis W. Anderson
ATTORNEY

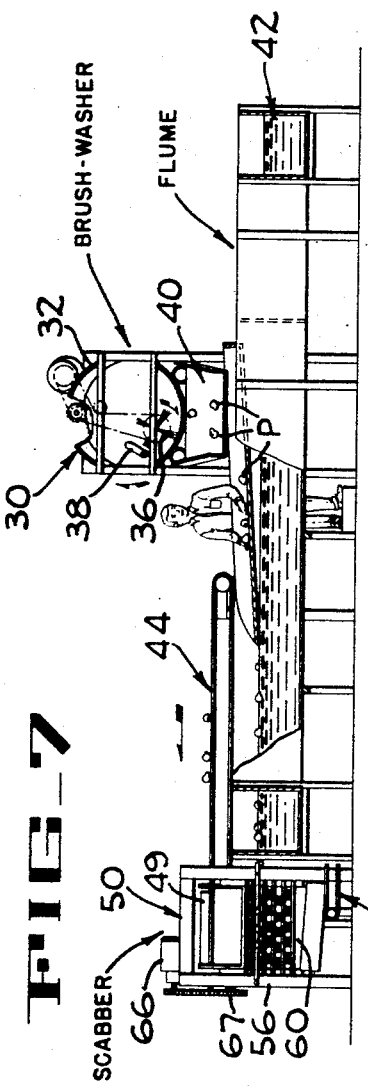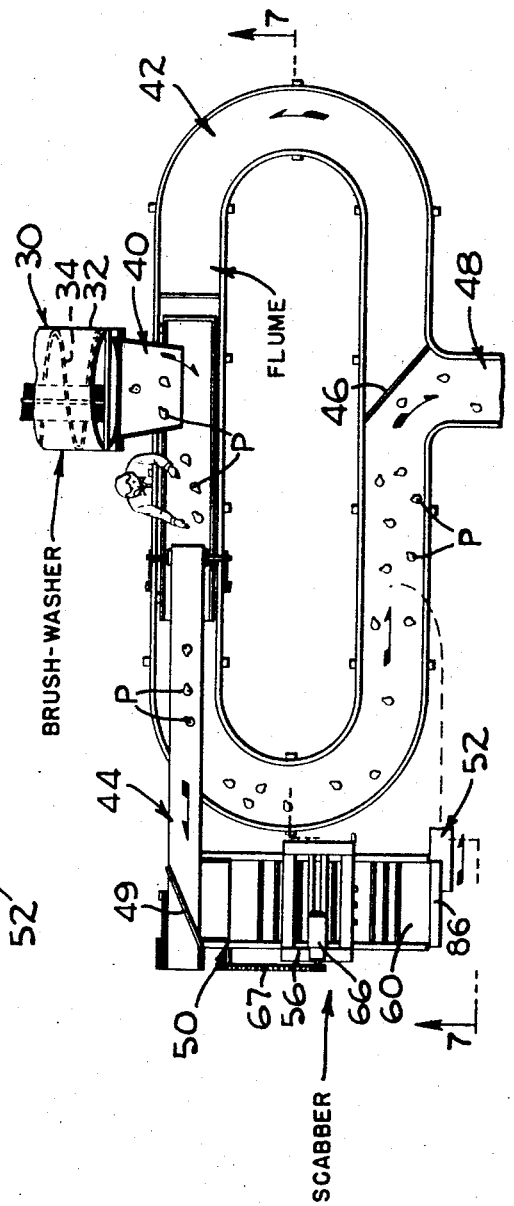

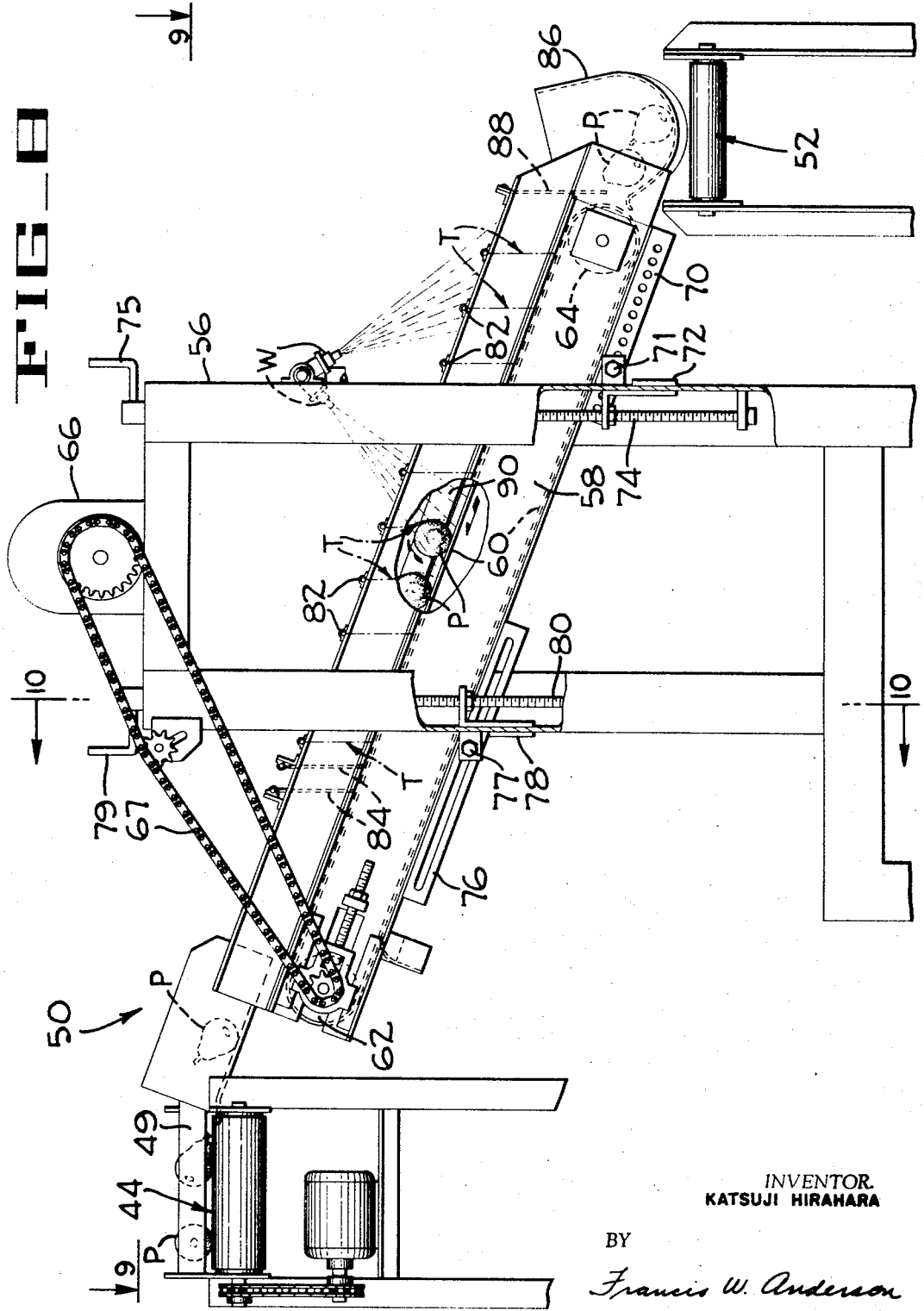

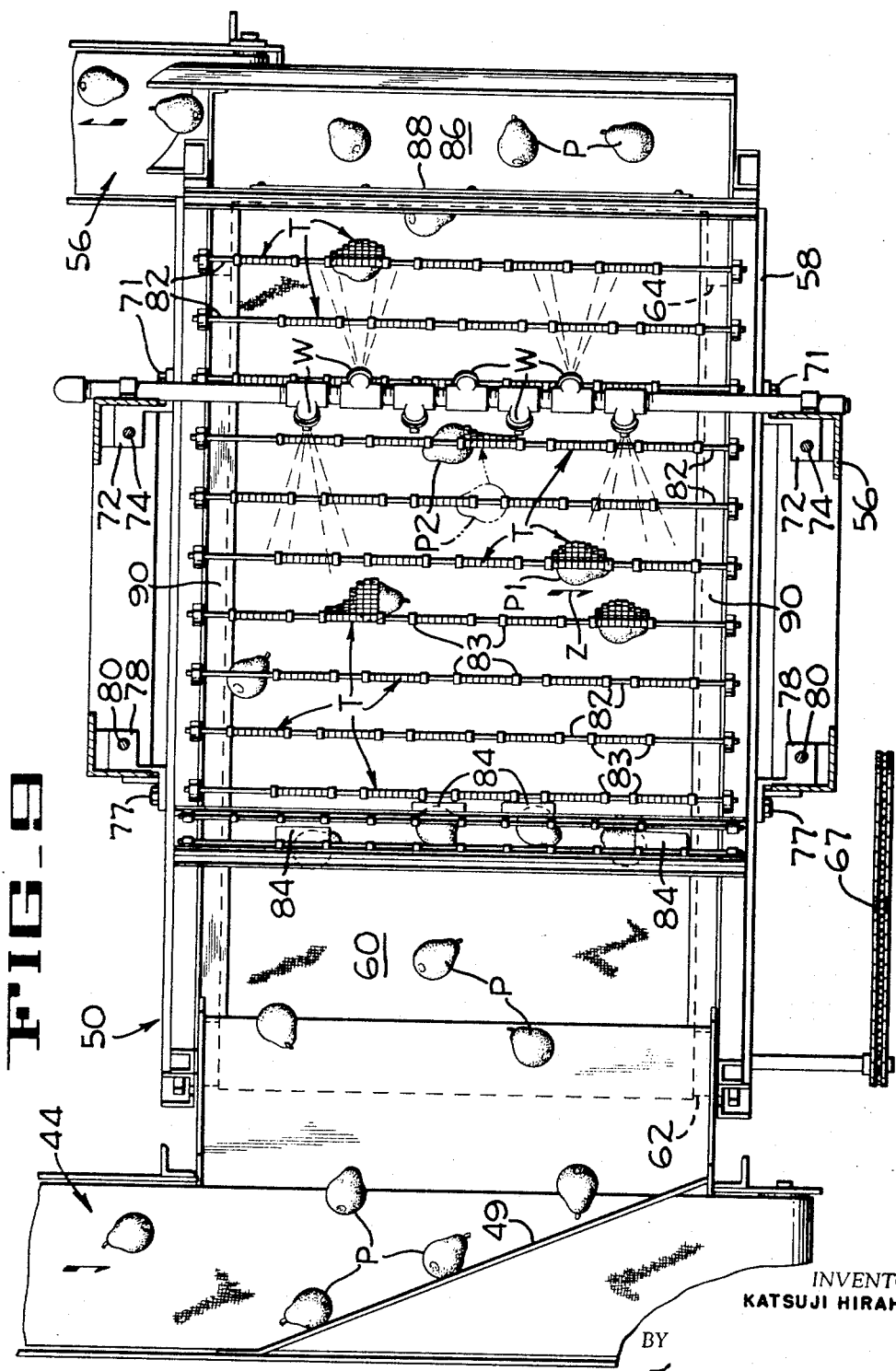

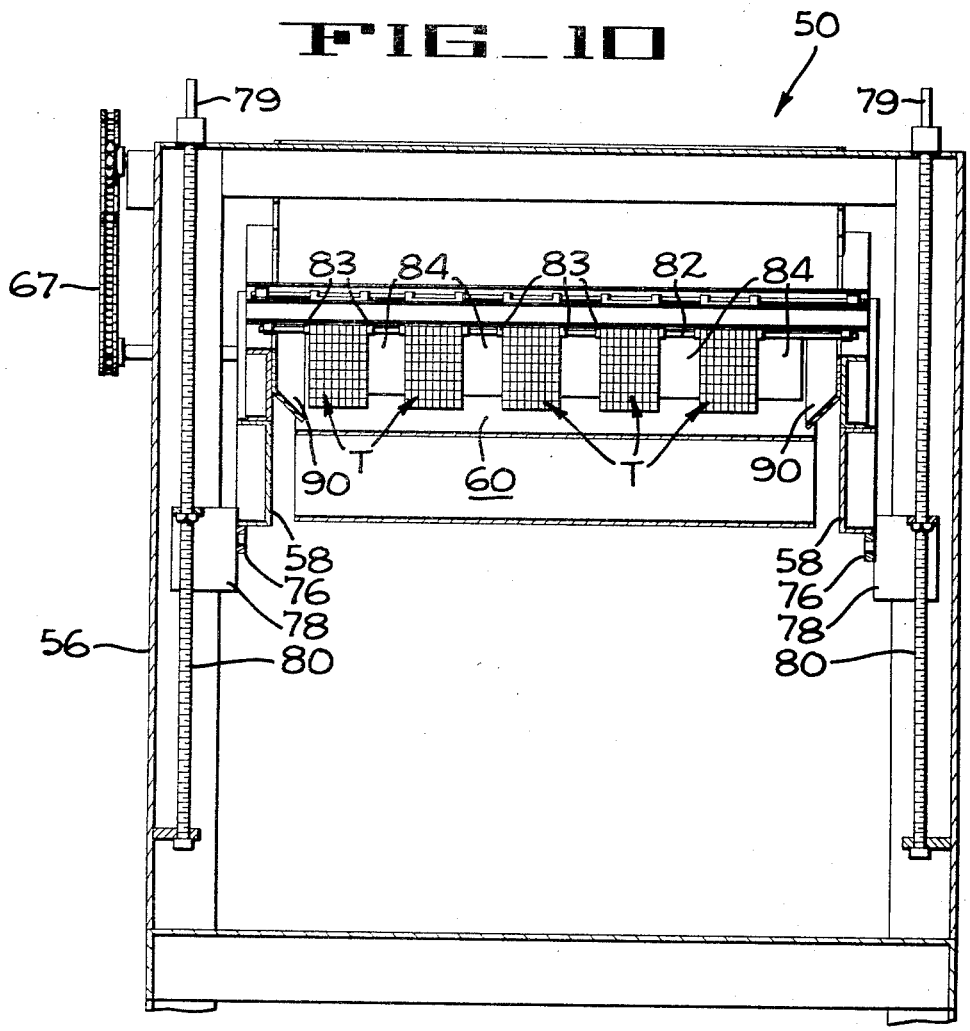
FIG_10
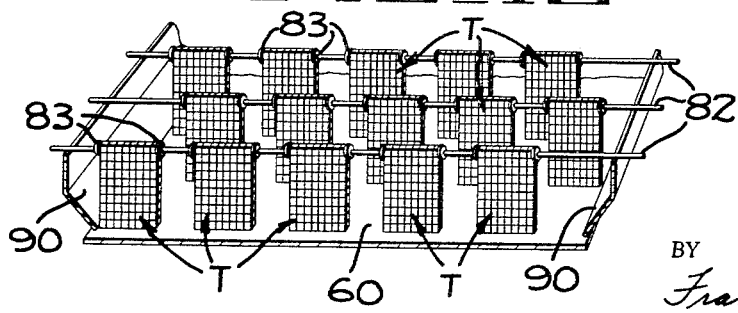
FIG_15

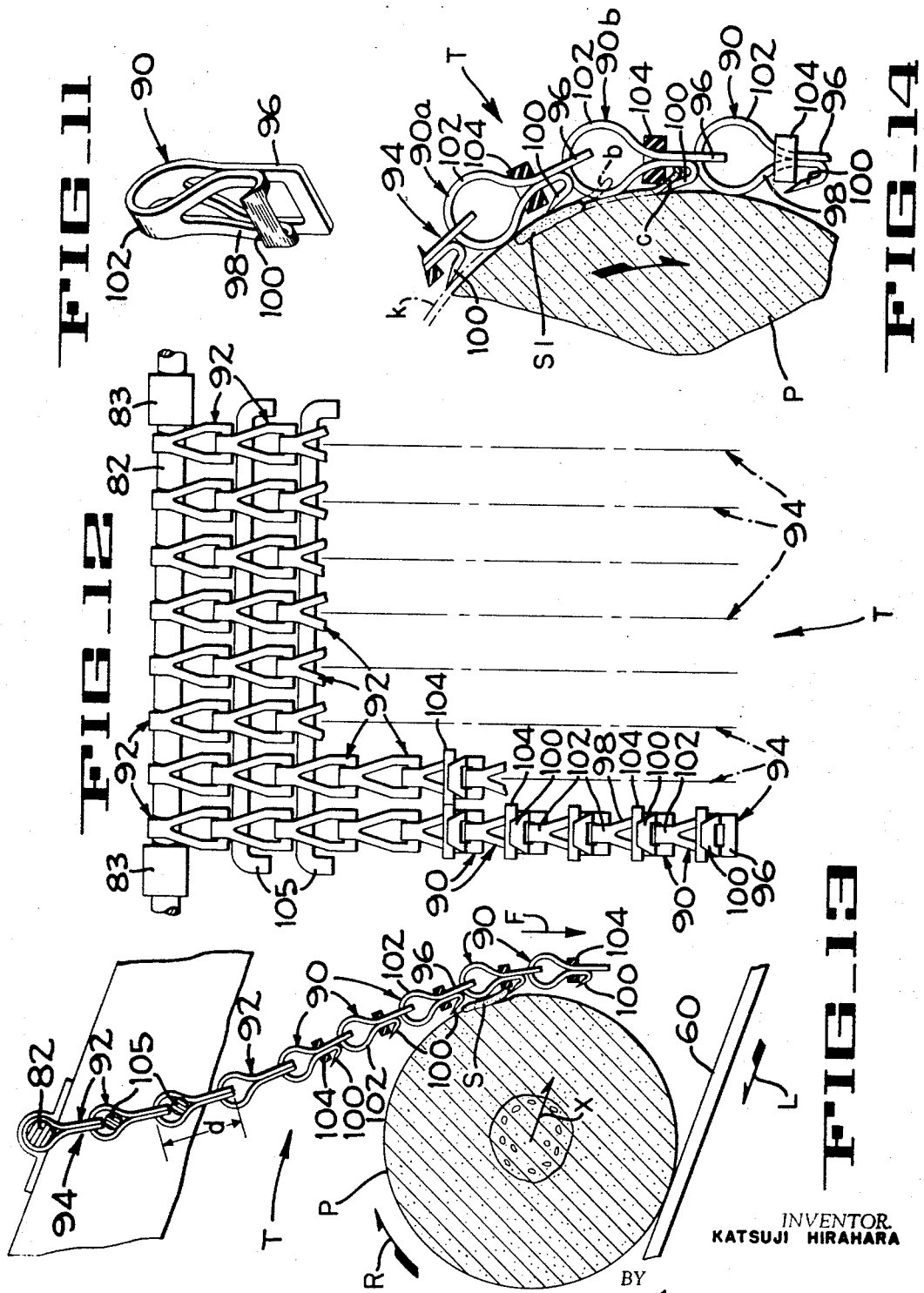

United States Patent Office 3,446,259
Patented May 27, 1969

3,446,259
REMOVING SCABS FROM FRUIT
Katsuji Hirahara, San Jose, Calif., assignor to FMC Corporation, San Jose, Calif., a corporation of Delaware
Filed Aug. 29, 1966, Ser. No. 575,763
Int. Cl. A23n 7/00, 15/00
U.S. Cl. 146—231
10 Claims

ABSTRACT OF THE DISCLOSURE

Scabby pears are lye peeled and then rolled down an upwardly moving belt and across suspended chain knives which have sharp edges that hook under and pry loose the scabs.

---

This invention relates to fruit preparation and more particularly to the removing of the skin from the fruit for further processing. The problems solved by the present invention arise in peeling processes for fruit such as pears and fruit of the pome genus wherein the fruit bears one or more disc-like, horny imperfections or flat excresences on their skins known in the trade as "scabs." Pears are particularly subject to scab formation during their growing period, it having been postulated that one of the causes of scab formation is abrasion of the fruit during growth. Since the scab problem is particularly prevalent in the pear processing industry, a preferred embodiment of the invention will be described in connection with the peeling of pears.

The invention is particularly useful in canneries or the like wherein the economics of the fruit preparation process make rapid, low cost peeling of the pears essential. The invention provides a method and apparatus for descabbing pears in which the scab is automatically pulled off the pear by applying a hard article against or into the scab generally tangential to the plane of adhesion and thereafter flicking, prying or urging the entire scab or a portion thereof free therefrom by exerting pressure against it. A preferred embodiment of the descabbing tool is shown hereinafter, but in the broader aspects of the invention, mechanized pick, sharp edge or gripping material such as loops of piano wire may be used, provided it has the mode of operation described above. Under the invention, means are used for feeding pears to the descabbing instrument, but in the broader aspects of the invention, pressure may be generated against the scab, either by movement of the pear or by control of the instrument. In the preferred embodiment, rotating pears engage a plurality of flexible edges disposed to drape around the pears and particularly engage any outstanding or hard surfaces.

Two commercial pear peeling processes are employed by canneries or the like, one of these being a process wherein the pears are impaled on rotary spindles and mechanically peeled by special knives. In this process, the scabs do not present a special problem because the peeling knives remove the scabs along with the skin and a small portion of the underlying flesh of the fruit.

Another commercial process for removing the skin from pears or the like is that described in the patent to Hickey et al. 3,246,677, assigned to the FMC Corporation. This process includes immersion of the pears in a hot caustic solution to loosen the skin, followed by the application of tangential friction forces to the skin by the use of a combined washer and rotating brush apparatus hereinafter referred to as a brush-washer. The latter process is highly effective in removing the skin from pears and by minimizing the removal of the underlying flesh of the pear, the process provides a high yield. However, the process does not effectively remove all of the scabs from the pears. Thus, if a harvest is one in which scabs are prevalent, peeling by the above process, which for convenience will be referred to as a "treatment process," requires supplemental operations to remove the remaining scabs.

In some fruit which is picked ripe, wherein the fruit is quite soft, the scabs are easily removed by merely flicking them off by insertion of a tool or fingernail, if the process is done by hand. Scabs of this type can even be removed before the fruit has been peeled. However, where the fruit has been picked green (as is common in the industry) or where the scabs are recessed to a plane beneath the surface of the skin, this removal process is not effective commercially and hence, does not solve the problems referred to. On some fruits, the scabs may protrude somewhat above the surface of the skin, whereas in others they may represent slight depressions which further complicate the problem. Finally, some scabs are brittle and cannot be flicked off in the manner described above in one piece and therefore fruit of this type requires repeated attack on the scabs, thereby rendering the scab removal costly. These factors may preclude the use of the treatment process for peeling the pears, despite the advantages of that process in increased yield and economy in apparatus and operating time.

Under the present invention, the aforesaid difficulties in using the treatment process for peeling scabby pears are eliminated without appreciably adding to the cost of the fruit preparation cycle. Under the present invention, the scabs are removed from the pears *after* the skins have been removed by the treatment process. Often, the scabs will now project slightly above the flesh of the peeled fruit, providing an edge by which the scab can be lifted from the body of the pear. In some cases, however, as when the fruit was picked green (a common condition) the scabs may not protrude substantially above the surface of the pear, even after it has been peeled by the treatment process. In either case, the method and apparatus of the present invention will remove the scabs. With some pears, and this is particularly true when they are picked green, the scabs will not flick off in one piece by the application of a single wedging or stripping force to the scabs. The present invention subjects the scabs to repeated attack without requiring a long residence time in the scabber.

It has also been found that some pears have formations that will be termed "incipient scabs." For reasons not clearly understood, these formations are sometimes hardened into scablike formations in the lye bath.

As mentioned, in some harvests, the scabs do not project appreciably above the surface of the flesh, even after the skin has been removed by a treatment peeling process. Also incipient scabs may be hardened into scab formations during lye peeling, and these are quite flush with the peeled surface. The present invention solves all of these scab problems by presenting sharp tools to the surface of the peeled pears. These engage the pears under relatively small forces, but the forces are large enough to cause tools to scrape into the soft exposed flesh sufficiently to hook under the scabs and strip them from the fruit. This feature of the invention also insures complete removal of scabs which break apart, because under the present invention, the scabs are repeatedly attacked by tools of the type described.

Briefly, and in accordance with the preferred embodiment of the invention, the scab removing tools are suspended flexible members that can move with the pears to a limited degree. In the form of the invention that is illustrated, the tools are made of suspended, free draping lengths of chain, making up clusters of sharp hooks that hang in rows across the path of the pears. The hooks are formed as light links of specially prepared chains. These act as curtains encountered by the pears during their progression through the machine. The pears are rotated by a retrograde belt which is inclined to provide gravity feed of the pears against and through the clusters of scab removing tools.

It is a feature of the present invention that in the case of pears, utilization is taken of their "conical" contour. By taking advantage of this pear contour, the pears can be subjected to a series of attacks by descabbing tools. When the pears are supported on a retrograde belt and fed by gravity against the tools as described, the pears will tend to gravitate axially in the direction of their stems. The clusters of scab removers are arranged in transversely extending rows and the clusters in each row are laterally spaced to provide gaps between the clusters. The clusters in the successive rows are staggered so that pears moving through the gaps in an upstream row will roll down against clusters in the next downstream row. This permits the pears to work their way down the machine without prolonged interference, and at the same time insures that the pears will be treated by the scab removing tools more than once during their progress. Another feature of the invention is that in a preferred embodiment the scab removing tools will remove a small and controlled amount of flesh from the pear. This gives access to the edges of those scabs which may be recessed within the pear body. This assures a higher percentage of scab removal without significant loss in yield.

In a preferred embodiment of the invention, during the scabbing process a stream of water is sprayed over the pears to wash clear the removed scabs and slivers of flesh so that no debris interferes with continuous progress of the process.

The manner in which these and other features and advantages of the invention may be attained, will be apparent from the following description of a preferred embodiment thereof.

In the drawings:

FIGURE 1 is an elevation of a pear having scabs thereon.

FIGURE 2 is an enlarged fragmentary section taken on line 2—2 of FIGURE 1.

FIGURE 3 is a section like that of FIGURE 2 showing a pear after it has been treatment peeled.

FIGURE 4 is a section like that of FIGURE 3 illustrating the principle of scab removal.

FIGURE 5 is a diagrammatic side elevation of a treatment peeling system of the type used for removing the skins from pears.

FIGURE 6 is a plan of a fruit preparation system incorporating the invention.

FIGURE 7 is a vertical section of the system taken on line 7—7 of FIGURE 6.

FIGURE 8 is a side elevation of a scabbing machine embodying the invention.

FIGURE 9 is a plan of the machine looking along line 9—9 of FIGURE 8.

FIGURE 10 is a vertical section of the machine looking along line 10—10 of FIGURE 8.

FIGURE 11 is an enlarged perspective of one of the scabbing links of the preferred embodiment of the invention.

FIGURE 12 is a front elevation of a cluster of scabbing links.

FIGURE 13 is a section illustrating diagrammatically the process of removing scabs.

FIGURE 14 is a double sized enlarged section like that of FIGURE 13 illustrating the action on a pear having recessed scabs.

FIGURE 15 is a diagrammatic perspective showing the staggered arrangement of clusters of scabbing tools.

Reference is first made to the diagrams of FIGURES 1–4 which illustrate various details of pears of the type in question and the principle of scab removal. FIGURE 1 is a side elevation of a typical pear P, before it is peeled, and shows two scabs S imbedded in the skin of the pear.

The enlarged section of FIGURE 2 shows a typical scab formation wherein the scab is substantially coextensive in depth with the skin $k$. FIGURE 3 of the diagram shows the pear after it has been treatment peeled. Here the skin $k$ has been removed, and a small thickness $a$ of the underlying flesh has also been removed from the body of the pear, during peeling. The scab S still adheres to the body of the pear and in this example, the scab projects somewhat from the pear surface.

In the diagram of FIGURE 4, a tool indicated generally and schematically as T, has been brought between the scab and the underlying body of the pear, and the tool is in the process of stripping the scab from the pear.

A system embodying the apparatus of the present invention will prepare pears like that of FIGURE 1 having scabs thereon, whether the pears be green or ripe and whether the scabs be flush with the skin, projecting slightly from the surface of the skin, or recessed somewhat within the skin and within the flesh of the pear. The system will, in general, perform a process for removing the scabs like that illustrated in FIGURE 4. The pears will usually have been treatment peeled by a mechanism of the type to be described, so that the pears are actually presented to the scabber in the peeled condition shown in FIGURE 3.

*General principles*

Although it is to be understood that the apparatus of the present invention for scabbing pears is not per se limited to the use of any particular skin removal system, the scabbing apparatus itself will be shown diagrammatically in connection with other equipment of the type which will often be associated with the apparatus, particularly equipment for the treatment peeling of pears before the scabbing operation.

Referring to FIGURE 5, a lye treatment bath, and a brush-washer (referred to previously as a treatment peeler) are illustrated in simplified diagrammatic form. Reference is made to the aforesaid patent to Hickey et al. 3,246,677 for additional details of this particular treatment peeler, which prepares pears in a manner in which they will be accepted and descabbed by an apparatus forming part of the present invention.

The pears are placed in the treatment peeler by means of an in feeder unit 10 whereupon they are dropped into a caustic bath immersion unit 12. In the treatment peeler shown, the immersion unit includes a special bucket conveyor 14 which holds the pears immersed in a caustic (lye) bath 16 for a length of time adequate to loosen the skins for later removal.

As explained in the aforesaid Hickey et al. Patent 3,246,677, typical caustic solution 16 will include 10 to 20 percent by weight of lye and will be at a temperature of 140 to 160 degrees F. The immersion time will be in the order of one to four minutes.

The buckets 14 are loaded from the feeder 10, hold the pears P in the lye bath, take them out of the bath, and dump them into a holding unit 20. Here the lye drains from the pears and the skin loosening action initiated in the lye bath is completed. The pears are then dropped into a steam heating unit 22 which then deposits them into a transfer flume 24. The pears are water cooled and propelled through the flume 24 by means of water admitted through a pipe 26 and are discharged into a brush washer 30.

In the brush washer, the pears are tumbled in a rotatable drum 32 having a helical rib 34 coiled around the inside of the drum. The loosening and peeling action is augmented by a rotary brush 36, which moves in the same direction but at a faster linear speed than the inner periphery of the tumbling drum, as seen in FIGURE 7. For example, if the drum rotates at 20 r.p.m., the brush 36 will rotate at 300 r.p.m., in a typical operating procedure. The loosening and removal of the skins is assisted by the action of water spray from a conduit 38. The peeled pears (which may still have scabs attached thereto) are discharged from the brush washer into a cross conveyor chute 40, which is also seen in FIGURES 6 and 7, and to which reference is now made.

The gravity conveyor 40 discharges into a continuous flume 42 carrying a circulating stream of water. This flume serves as a conveyor and the details thereof are not critical to the present invention. The pears P roll down the gravity conveyor 40 (which may be vibrated if necessary) and pass an inspection station at which an operator stands. The operator selects scabby pears and places them on a scabber feed conveyor 44. The scab-free pears continue on around the flume and are diverted by a diverter 46 into a discharge conveyor 48 for further processing.

The scabby pears on the scab feeder 44 are diverted by a diverter 49 and enter a feed hopper of the scabber, indicated generally at 50. The pears pass through the scabber, wherein the scabs are removed in a manner to be described presently, and the peeled and scabbed pears are discharged from the scabber into a discharge conveyor 52. In the system herein illustrated, as a typical installation embodying the invention, the peeled and scabbed pears can be reintroduced into the circulating stream of water in the flume 42 for discharge through the discharge conveyor 48, previously mentioned.

The scabber 50 (FIGURES 8–10) includes an inclined retrograde (uphill) conveyor, down which the pears roll for scabbing. In the progress, the pears encounter clusters of hanging scabber tools T, and due to the combined rotation and passage through the tools T, the tools strip and remove the scabs from the surface of the peeled pears. The scabber has a standard 56 that mounts an inclined conveyor frame 58 in the form of spaced beams, between which is the retrograde conveyor 60. The latter is of an endless belt having a friction surface, such as a rubberized canvas belt. The belt runs over a drive pulley 62 and an idler 64 and is driven by motor unit 66 and sprocket gearing 67. The unit 66 preferably includes a variable speed drive in order that the operating conditions of the scabber can be adjusted for the nature of the fruit being processed.

In order to adjust the inclination of the retrograde conveyor 60 a special mounting is provided, the details of which are not critical to the present invention. In the embodiment illustrated, this mounting includes a pair of apertured pivot plates 70 pivotally supporting at 71 a sliding carriage 72 that can be vertically adjusted by a hand screw 74 and handle 75. The other mounting assembly includes a slotted mounting plate 76 slidably supporting at 77 a carriage 78, the vertical position of which is adjusted by a hand screw 80 and handle 79. These inclination adjustments, coupled with the conveyor speed adjustment which can be set into the variable speed drive unit 66, cooperate to permit selection of both the angle of fall of pears along the retrograde conveyor, as well as the speed of the conveyor. Hence the angular and linear velocities of the pears P progressing through the scabber can be selected.

The tools T form an interrupted curtain (see FIGURE 15) that catch the pears and momentarily impede their progress down the conveyor, as the scabs are removed from the pears. These tools hang from transverse rods 82 (FIGURE 12) extending across and above the inclined frame 58, and they are located by collars 83.

In order to snub the pears and prevent them from striking the first row of tools T with damaging velocity, rubber snubber curtains 84 depend at the entrance hopper to the conveyor. In order to reduce the velocity of the pears as they fall out of the conveyor into a discharge hopper 86 that leads to the discharge conveyor 52 previously described, a rubber snubber curtain 88 depends from the frame at the discharge end of the scabber. As best seen in FIGURE 10, side rails 90 are extended along the inclined frame 58 in order to confine the pears on the conveyor 60 when they reach the lateral confines of the belt.

As best seen in FIGURE 8, a row of nozzles W is mounted above the belt to wash away the debris and clean the knives during the process.

Scabbing tools

Scabbing tools of a preferred design are illustrated in FIGURES 11 and 12 and their action in operation is illustrated somewhat diagrammatically in FIGURES 13 and 14, to which reference is now made for description of the tools.

The tools T may be described as flexible, in that they can move along the conveyor with the pears, to a limited degree. In the embodiment of the invention under description, these tools are basically made up of suspended, free draping chain links, some of which serve as hooks, claws or scab stripping elements. They also are designed to peel off a very thin strip of the flesh of the peeled pears passing through the machine.

The lower links 90, which are the working elements, are suspended by similar links 92, the uppermost of which are pivotally suspended from the transverse rods 82, as best seen in FIGURES 12 and 13. The tool cluster T is located on the rod 82 by collars 83. In the illustrated embodiment, the general configuration of the chain links is that of a conventional type sash chain. A cluster of tools T, in the form shown, is made up of eight individual chains 94 (FIGURE 12), each chain 94 having four upper links 92 of conventional sash chain form, and four of the specially formed scab removing links 90 disposed in the path of the pears passing through the scabber.

FIGURE 11 is an enlarged perspective of one of the special links 90. Each link has a straight leg 96 and a scab removing leg 98. The scab removing leg is recurved to form a sharpened hook or claw at 100, to form a combined pear engaging and scab stripping member. As can be seen in FIGURES 13 and 14, the loop 102 on each of the links 90 forms a surface that can ride against the periphery of the pear. In order to serve as a depth gauge for the peeling action of the hooked blades 100, thick rubber bands 104 surround the legs of the links between the loop 102 and the blades, and these bands act in a manner that will be obvious on inspection of FIGURE 14 to provide the gauging function referred to. It is to be understood that if these rubber gauge members 104 are abraded at an unacceptably high rate, they can be replaced by metal members welded to or struck from the links that serve the same function.

The links 90, 92 are relatively light in weight and hence provide a gravity force F (illustrated by the arrow in FIGURE 13) upon the pears that is quite small, namely in the order of two or three ounces at the most. Thus, it has been found helpful to laterally couple one or more of the upper links 92 by means of cross rods 105, as seen in FIGURES 12 and 13. In the embodiment illustrated and when used to descab pears, the unit length of each of the links 90, 92 (illustrated at $d$ in FIGURE 13) is in the order of three quarters of an inch, and the full width of the links, as they are viewed in FIGURE 12, is in the order of three eights of an inch.

In order to take advantage of the transverse motion of the pears engendered by their conical contour, the clusters of tools T along each of the transverse rods 82 are staggered from row to row, as best seen from FIGURE 15. Thus, a pear which escapes between adjacent clusters T in one transverse row will progress directly to a downstream cluster and hence, will again be subjected to the action of the tools.

Operation

The treatment peeling of the pears and their introduction to the scabber 50 has been described previously in connection with FIGURES 5, 6 and 7 and the description of this step in the cycle will not be repeated. Pears entering the scabber 50 from the feed conveyor 44 and the deflector 49 fall onto the retrograde belt 60 which will have a speed generally in the range of 250 to 720 feet per minute. The lower speeds in the range (say 276 feet per minute), have been found to give satisfactory operation. Speeds on the order of 700 feet per minute and higher begin to generate bounce and kicking of the pears in transit. A preferred inclination angle of the belt from horizontal is 22 degrees, although an angle somewhat less than this, say 20 degrees, is satisfactory and a larger angle, say 24 degrees, is also satisfactory. However, experiments have shown that although as the angle increases above the preferred angle of 22 degrees, sliding of the pears takes place and flat spots may develop due to the abrading action of the belt 60. A typical residence time of the pears in the descabber belt would be on the order of twenty to forty seconds. Thus, it can be seen that there is no one preferred set of operating conditions. A typical set of operating conditions would be in the order of a conveyor belt inclination of 22 degrees, a belt speed of 400 feet per minute. The effective length of the scabber will be about five feet and there will be ten rows of tool clusters with five or six clusters in each row of the type described.

The action of the special links 90 in removing scabs from special peeled pears is illustrated in FIGURE 13. The linear motion of the belt 60, is indicated by the arrow L and the gravity fall of the pears is indicated by the arrow R. The gravity fall brings the rotating surface of the fruit against the hook-like blades 100. These blades will cut or scrape away some of the exposed flesh of the pears. The total loss in yield is usually well under ten percent, and this represents considerably less than the loss in yield which occurs when the pears are mechanically peeled and trimmed to remove scabs in the conventional manner.

The relative rotation between the fruit and the tools will, during the progress of the pears through the scabber, produce a condition wherein sooner or later a tool or tools can enter between the scab S and the pear and strip the scab from the body of the fruit. If the scab breaks during the process, it is probable that the partially removed scab will be again attacked, and the process continued until the scab is entirely removed.

The efficiency of the operation is improved by taking advantage of the conical spin motion of articles such as pears. This is accomplished by staggering the curtains of tools T, as seen in FIGURES 9 and 15. In FIGURE 9, a pear P1 has fallen into full engagement with one of the curtains of tools T and is being descabbed. Also, the rotation of the pear on the belt 60 causes it to move to the left (in the direction of its stem), as indicated by the arrow Z. In this figure, a pear P2 is indicated in dotted lines as having moved to the right (in the direction of its stem) to a gap between a curtain of tools, to have fallen against a downstream curtain for further scabbing operations, and to have again moved to the right toward a gap in that row of tool clusters.

In order to augment the effectiveness of the scabbers it has been found that the upper ends of the individual chains of links 90, 92 are partially confined as by the rods 105 (FIGURE 12) a somewhat more efficient action will take place. It has also been found that the rubber band gauge members 104 effectively limit the peeling action on the exposed flesh of the pears and holds the reduction in yield down to a minimum, namely, in the order of eight percent as previously mentioned.

FIGURE 14 illustrates, in idealized diagrammatic form, an action that takes place on the scab S1 that is recessed beneath the surface of a treatment peeled pear. As mentioned, this condition often occurs when the pears are hard or green and is the most demanding condition met by the apparatus. Or, the scab may have been formed in the lye bath from an "incipient" scab. For sake of illustration, it will be assumed that the entire action takes place at one cluster of tools and is performed by adjacent links 90a and 90b. The skin k which has been removed is illustrated in broken lines in FIGURE 14. It can be seen that the scab S1 was recessed below the surface of the skin, and in this case the scab is almost flush with the body of the peeled fruit. The knife-like hook 100 on the link 90a is illustrated as having peeled off a thin strip b of flesh, but this is assumed to have been insufficient for the hook on link 90a to catch and strip off the recessed scab S1. Thus, the blade of link 90a is shown as riding up over the scab. A blade-like hook 100 on the next (lower) link 90b is being approached by the scab S1, but the scab has not yet reached the blade. The blade on link 90b is shown as stripping off a thin layer of flesh indicated at c. As can be seen by the broken lines in the drawing, removal of the second layer of flesh c will expose the edge of the scab S1 to the blade 100 on link 90b, so that this blade or a succeeding blade will strip the scab, or at least part of it, from the body of the fruit. FIGURE 14 also illustrates how the band members 104 serve as gauges, to limit the depth of the peeling action of the blades 100.

The entire action is facilitated and the scabbed pears rendered ready for further processing by the action of the water spray unit W (FIGURE 8) which cleans up the pears as they are being treated and hence insures that no debris will interfere with the scab stripping action made possible by the present invention. It is somewhat surprising that the horny, strongly inherent scabs of this type can be hooked and removed automatically by the action of tools which apply only a few ounces of gravity force to the fruit.

It is also surprising that scabbing takes place with so little loss in yield as the eight to ten percent loss previously mentioned. Part of the success of the operation is believed to be the use of tools of the type described, in connection with staggered clusters of tools as illustrated in FIGURES 9 and 15, which provide a lateral motion of the pears across the clusters as the pears are being processed, but which also permits pears to clear the clusters so they can be washed clean, by the water spray W. This transverse progression of the fruit also prevents pears from hanging up at any individual cluster and assures that they will pass progressively and smoothly through the apparatus. It also helps prevent the development of flat spots on the pears due to abrasion by the belt 60.

Thus, it can be seen that a simple, economical self-cleaning scabbing unit is provided which will make possible utilization of the highly desirable treatment method of pear peeling, even on yields of pears which have a relatively large number of scabs. The scabber is relatively small and can be easily adapted to fit into various preparation lines. The scabbing tools themselves are easily fabricated and can be readily replaced because they are out in the open and accessible. Also the action of the machine can be readily observed and adjustments made for various types of starting materials are simple and rapid.

In addition, the ability of the scabber to work on peeled pears, even those which have been immersed in lye, makes it possible to prepare scabby pears for further processing by starting with a treatment type peeler.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. The method of preparing scabby fruit comprising the steps of loosening the skin in a caustic bath, friction-peeling the loosened skin, forcing a thin tool against the scab, and prying the scab from the fruit.

2. The method of removing scabs from peeled scabby fruit comprising the steps of rolling the fruit down an inclined plane and simultaneously rotating the fruit against a succession of clusters of resiliently suspended hook-like tools for prying loose the scabs, and washing the fruit during the process.

3. The method of removing scabs from peeled scabby pears comprising the steps of simultaneously rotating the pears and bringing them against individual clusters forming a series of rows of laterally spaced clusters of hook-like tools, while accommodating lateral translation of the pears so that they move clear of and pass between clusters of tools in a row, and causing the pears thus cleared to engage succeeding clusters of tools.

4. Apparatus for removing the scabs from fruit such as pears or the like comprising fruit support means including an endless belt conveyor with its pear supporting surface running uphill, a plurality of scab stripping tools having thin scab catching edges mounted at said conveyor, said conveyor causing the fruit to rotate while moving down across said tools.

5. Apparatus for removing the scabs from fruit such as pears or the like comprising fruit support means having an inclined, gravity feed, fruit supporting surface, a plurality of scab stripping tools mounted at said surface, scab stripping tools comprising suspended flexibly mounted members having formed therein said scab hooking edges, and means for causing the fruit to rotate while moving down along said supporting surface and across said tools.

6. The apparatus of claim 5, wherein means are provided for spraying said tools and the fruit with water.

7. The apparatus of claim 5, wherein said flexibly mounted members are lightweight chain links, those links that engage the fruit each being formed with sharpened hooks to form said scab hooking edges.

8. Fruit scabbing apparatus comprising a downwardly inclined, upwardly moving fruit conveyor, and laterally extending, longitudinally spaced rows of scab catching tools along said conveyor, the tools in a row being formed in laterally spaced clusters of yieldably supported scab catching tools, the clusters in successive rows being staggered, the spacing between clusters accommodating passage of a fruit for advance to a downstream cluster of tools.

9. A pear scabbing knife comprising a suspended, free hanging chain having a plurality of scabbing links, said links having depending legs joined by an enlarged, pear engaging loop, the free end of these legs which face the pears being upturned and sharpened to form pear scab engaging edges.

10. The pear scabbing knife of claim 9, in which a depth gauge is provided between the loop and sharpened edge of said links.

References Cited

UNITED STATES PATENTS

| | | | |
|---|---|---|---|
| 899,340 | 9/1908 | Simpson | 146—49 |
| 1,226,418 | 5/1917 | Trust | 146—50 |
| 2,569,207 | 9/1951 | Waters | 146—43 |
| 3,246,677 | 4/1966 | Hickey et al. | 146—47 X |

W. GRAYDON ABERCROMBIE, *Primary Examiner.*

U.S. Cl. X.R.

146—47, 241